US012388951B2

(12) United States Patent
Bönisch (10) Patent No.: US 12,388,951 B2
(45) Date of Patent: Aug. 12, 2025

(54) METHOD FOR ASSIGNING A CREATOR TO A DIGITAL MEDIA FILE AND/OR FOR DISTRIBUTING THE DIGITAL MEDIA FILE, RECORDING DEVICE AND DISPLAY DEVICE

(71) Applicant: ETO MAGNETIC GmbH, Stockach (DE)

(72) Inventor: Benjamin Bönisch, Bodman-Ludwigshafen (DE)

(73) Assignee: ETO MAGNETIC GMBH, Stockach (DE)

( * ) Notice: Subject to any disclaimer, the term of this patent is extended or adjusted under 35 U.S.C. 154(b) by 0 days.

(21) Appl. No.: 17/796,372

(22) PCT Filed: Jan. 28, 2021

(86) PCT No.: PCT/EP2021/051962
§ 371 (c)(1),
(2) Date: Jul. 29, 2022

(87) PCT Pub. No.: WO2021/151999
PCT Pub. Date: Aug. 5, 2021

(65) Prior Publication Data
US 2023/0112610 A1    Apr. 13, 2023

(30) Foreign Application Priority Data

Jan. 29, 2020  (DE) .................... 10 2020 102 161.5
Aug. 6, 2020   (DE) .................... 10 2020 120 828.6

(51) Int. Cl.
*H04N 5/77*    (2006.01)
*G06F 21/10*   (2013.01)
(Continued)

(52) U.S. Cl.
CPC ............. *H04N 5/772* (2013.01); *G06F 21/10* (2013.01); *G06V 40/172* (2022.01)

(58) Field of Classification Search
None
See application file for complete search history.

(56) References Cited

U.S. PATENT DOCUMENTS 10,396,985 B1 *  8/2019  Nagelberg ............ H04L 9/3247
2002/0080256 A1  6/2002  Bates et al.
(Continued)

FOREIGN PATENT DOCUMENTS

DE    112012002579 T5    3/2014
EP       3514760 A1       7/2019
(Continued)

OTHER PUBLICATIONS

German Search Report on the Patentability of Application No. DE102020120826.6, Mailed Feb. 15, 2021, 19 pages.
(Continued)

*Primary Examiner* — Hung Q Dang
(74) *Attorney, Agent, or Firm* — Womble Bond Dickinson (US) LLP (57) ABSTRACT

Method for assigning a creator to a digital media file and/or for distributing the digital media file, recording device and display device
A method for an assignment of at least one creator to a digital media file comprises at least one method step in which the digital media file is recorded by means of a recording device of a recording apparatus, in particular a front-facing camera of the recording apparatus, and is provided with metadata,
wherein the metadata comprises at least one creator information,
the creator information being generated automatically in the recording period of the digital media file,
(Continued)

wherein the creator information is realized as a user identifier, and wherein in the method step at least the user identifier is determined and/or verified by a safety device, wherein the safety device comprises a camera of the recording apparatus, in particular a rear-facing camera of the recording apparatus, by means of which the determination and/or verification of the user identifier of the user making the recording is carried out by the recording device in the recording period of the digital media file.

20 Claims, 5 Drawing Sheets

(51) Int. Cl.
| | |
|---|---|
| *G06F 21/32* | (2013.01) |
| *H04L 9/32* | (2006.01) |
| *H04N 21/2743* | (2011.01) |
| *H04N 21/278* | (2011.01) |
| *H04N 21/414* | (2011.01) |
| *H04N 21/4223* | (2011.01) |
| *H04N 21/4415* | (2011.01) |
| *H04N 21/45* | (2011.01) |
| *H04N 21/658* | (2011.01) |
| *H04N 21/8352* | (2011.01) |
| *G06V 40/16* | (2022.01) |

(56) References Cited

U.S. PATENT DOCUMENTS

| | | | |
|---|---|---|---|
| 2002/0138362 A1* | 9/2002 | Kitze | G06Q 30/06 |
| | | | 705/26.81 |
| 2011/0119293 A1* | 5/2011 | Taylor | G06F 21/10 |
| | | | 707/769 |
| 2011/0202968 A1* | 8/2011 | Nurmi | G06F 21/10 |
| | | | 726/1 |
| 2012/0331566 A1 | 12/2012 | Lection et al. | |
| 2016/0275989 A1* | 9/2016 | Gudjonsson | H04N 5/765 |
| 2016/0283476 A1 | 9/2016 | Guy et al. | |
| 2017/0011204 A1 | 1/2017 | Meah | |
| 2017/0270970 A1 | 9/2017 | Ho et al. | |
| 2018/0264347 A1 | 9/2018 | Tran et al. | |
| 2021/0034717 A1* | 2/2021 | Cardonha | G06F 21/6254 |
| 2022/0237996 A1* | 7/2022 | Hodge | G08B 13/19647 |

FOREIGN PATENT DOCUMENTS

| | | | | |
|---|---|---|---|---|
| KR | 1020150101334 A | | 9/2015 | |
| WO | WO-2019004118 A1 | * | 1/2019 | G06F 16/27 |
| WO | WO-2020108049 A1 | * | 6/2020 | H04L 9/40 |

OTHER PUBLICATIONS

International Search Report on the Patentability of Application No. PCT/EP2021/051962, Mailed Apr. 23, 2021, 2 pages.

International Preliminary Report on the Patentability of Application No. PCT/EP2021/051962, Mailed Sep. 1, 2021, 5 pages.

Office Action for European Patent Application No. 23185982.8, mailed Nov. 6, 2023, 15 pages.

Office Action received in related European Application No. 23185982.9, mailed Nov. 29, 2024, 13 pages.

* cited by examiner

METHOD FOR ASSIGNING A CREATOR TO A DIGITAL MEDIA FILE AND/OR FOR DISTRIBUTING THE DIGITAL MEDIA FILE, RECORDING DEVICE AND DISPLAY DEVICE

RELATED APPLICATIONS

The present application is the National Phase of International Application No. PCT/EP2021/051962 filed on Jan. 21, 2021, which claims priority to the benefit of German Patent Application no. 10 2020 102 161.5 filed Jan. 29, 2020 and German Patent Application no. 10 2020 120 828.6, and the disclosures of which are hereby incorporated herein by reference in their entireties.

PRIOR ART

The invention concerns a method for assigning at least one creator to a digital media file according to the preamble of claim 1, a method for distributing digital media files according to the preamble of claim 15, a recording apparatus according to claim 19 and a display device according to claim 20.

A method for assigning at least one creator to a digital media file has already been proposed, with at least one method step in which the digital media file is recorded by means of a recording device of the recording apparatus and is provided with metadata, wherein the metadata comprises at least one creator information, the creator information being realized as a user identifier and being generated automatically in the recording period of the digital media file, and wherein in the method step at least the user identifier is determined and/or verified by a safety device.

The objective of the invention is in particular to provide a method with advantageous characteristics in regard to a user identification, which is in particular at least substantially forgery-safe. The objective is achieved according to the invention by the features of patent claims 1, 15, 19 and 20 while advantageous implementations and further developments of the invention may be gathered from the sub-claims.

Advantages of the Invention

The invention is based on a method for an, in particular at least substantially forgery-safe, assignment of at least one creator to a digital media file, with at least one method step in which the digital media file is recorded by means of a recording device of the recording apparatus, in particular a front-facing camera of the recording apparatus, and is provided with metadata, wherein the metadata comprises at least one creator information, the creator information being realized as a user identifier and being generated automatically, in particular by the recording apparatus, preferably by an application software of the recording apparatus, in the recording period of the digital media file, and wherein in the method step at least the user identifier, in particular at least a user identity, is determined and/or verified by a safety device.

It is proposed that the safety device comprises a camera of the recording device, in particular a rear-facing camera of the recording apparatus, by means of which the determination and/or verification of the user identifier, in particular the user identity, of the user making the recording is carried out by the recording device in the recording period of the digital media file. This in particular enables advantageous creator identification. It is advantageously possible to make sure that the user initiating the recording of the digital media file is also defined as the creator of the digital media file. Advantageously, moreover an especially simple and user-friendly automated user identification of a user creating a digital media file is enabled. It is also advantageously possible to facilitate especially simple and user-friendly automated creation of a digital media file containing creator information. Advantageously an especially simple, in particular time- and cost-saving, creator documentation is enabled for a digital media file. Advantageously a high degree of information safety is attainable.

A "digital media file" is in particular to mean an acoustic and/or visual digital media file, for example a sound file or preferentially an image file or a video file. Particularly preferentially the digital media file is implemented as a digital photograph. A "recording device" is in particular to mean a recorder, e. g. a sound and/or image recorder, preferably a microphone and preferentially a camera, in particular digital camera. The recording device is in particular integrated in the recording apparatus, for example as a smartphone camera or as a camera lens of a digital camera. By "metadata" is in particular structured data to be understood which contains information of features of the respective digital media file. Preferably the metadata is integrated in the digital media file and/or inseparably connected with the digital media file.

The term "in the recording period" is in particular to mean a temporal proximity of a recording of the digital media file, in particular of an activation and/or deactivation of the recording, and/or of the recording period the digital media file and/or an exact time of the recording or an exact recording period. The temporal proximity in particular extends over few seconds (e. g. maximally 10 s, maximally 6 s, maximally 3 s or no more than 1 s) or preferably over few fractions of a second (e. g. maximally ⅒ s, maximally 1/100 s or maximally 1/1000 s). Preferentially the temporal proximity extends over a period that starts at most ten seconds, advantageously at most one second, preferably at most a tenth of a second and particularly preferably at most a hundredth of a second before the recording and/or before the recording period, and/or ends at most ten seconds, advantageously at most one second, preferentially at most a tenth of a second and particularly preferentially at most a hundredth of a second after the recording and/or after the recording period. However, it is also conceivable that the recording period extends over a time interval that can be set by a user and/or over a time interval during which the user is reliably identifiable by the safety device, for example by a user's voice being recognized repeatedly or by the user's face being permanently in a view field of a camera of the recording apparatus.

By a "user identifier" is in particular a feature to be understood which is linked to a user's identity and is preferably configured for an unambiguous identification of the user. The user identifier may be embodied, for example, as a user authentication, in particular a user authentication based on a Distributed Ledger Technology (DLT), in particular a user authentication based on a DLT technology having a directed acyclic graphs (DAG) architecture, preferably a DLT technology having a transaction-based directed acyclic graphs (TDAG) architecture, for example as an IOTA™-ID, as a name, as a user code, as a biometric characteristic, or something like that. In particular, in the recording period of the digital media file the user identifier is automatically added to the metadata of the recorded digital media file as a creator information, in particular by the recording apparatus, preferably by an application software (app) of the recording apparatus. Preferably the user identifier is stored in the recording apparatus and/or in the app of the recording apparatus. Alternatively, the user identifier may be stored on a server, for example a cloud, which can be queried by the recording apparatus and/or by the app of the recording apparatus, in particular after determination and/or verification by the safety device. In particular, the safety device is configured to capture and/or determine at least one safety feature of a user that is unambiguously assignable to the user. In particular, the safety device is configured, in particular in a combination with the app, to check at least one safety feature of a user that is unambiguously assignable to the user, for example by matching the safety feature with an internal database of the app or with an external database that can be queried by the app. In particular, the safety device is configured, on the basis of checking at least one safety feature, to permit an assignment of a recorded digital media file to an identified user, in particular user identifier, preferably by the app of the recording device. "Configured" is in particular to mean specifically programmed, designed and/or equipped. By an object being configured for a certain function is in particular to be understood that the object fulfills and/or executes said certain function in at least one application state and/or operation state.

Furthermore, it is proposed that at least a face recognition and/or a facial-feature recognition is carried out by the safety device for a determination and/or verification of the user identifier, in particular the user identity, of the user making the recording. This in particular enables advantageous creator identification. In particular, a high degree of forgery safety is advantageously attainable. Advantageously, particularly reliable creator identification is enabled. Moreover, this advantageously allows especially user-friendly identification of the user, which is preferably operation-free for the user. In particular, the face recognition and/or the facial-feature recognition are/is effected on the basis of images recorded by the camera, in particular during the recording of the digital media file by the recording device. For example, during a recording of an image or video by the front-facing camera of a smartphone, a face recognition of the creator of the image or video is carried out in parallel by the rear-facing camera of the smartphone, wherein the user identity determined by the face recognition or the user identifier determined by the face recognition is stored in the metadata of the image or video as a creator information. In particular, the user making the recording is the creator of the digital media file. It is in particular conceivable that the face recognition and/or facial-feature recognition carried out by the safety device is implemented using the Face-ID® technology of the Apple company (Cupertino, USA). It is in particular conceivable that the safety device comprises more than one camera of the recording apparatus, for example at least one TrueDepth® camera like the cameras built into the apparatuses of the Apple company (Cupertino, USA), a 3D camera and/or an infrared camera, in particular in a combination with a point projector, and/or an infrared illuminator, preferably for carrying out a Face-ID® face recognition and/or a Face-ID® facial-feature recognition.

It is also proposed that the recording device is realized as the front-facing camera of the recording apparatus, wherein a view field of the front-facing camera and a view field of the camera, which is in particular embodied as a rear-facing camera of the recording apparatus, are oriented or can be oriented in at least substantially opposed directions. In this way in particular advantageous creator identification is enabled. Advantageously this allows especially user-friendly identification of the user, which is preferably operation-free for the user. "Substantially opposed" is here in particular to mean an orientation of a direction relative to a reference direction that is opposed by 180°, the direction having a deviation from the reference direction that is opposed by 180° which is in particular smaller than 8°, advantageously smaller than 5° and especially advantageously smaller than 2°.

If the user identifier is pseudonymized or de-identified, advantageously a high level of information safety is attainable. It is in particular conceivable that an assignment of the user identifier to a user identity, i. e. in particular a re-identification or a de-pseudonymization, is carried out by the local app, by a central server administrated, for example, by a provider of the app, or by an external institution, for example the IOTA™ foundation. In particular, the user identifier, the user identity and/or the assignment of user identifier and user identity are/is encoded by DLT technology. It is conceivable that the user identifier is safely assigned to a user identity via a known Know-Your-Customer method, like for example a Post-Ident method or a Video-Ident method. This in particular advantageously allows augmenting forgery safety.

It is further proposed that the metadata comprises at least one further creator information, which is realized as a blockchain timestamp or as a Digital Ledger Technology (DLT) timestamp, in particular a DAG timestamp, preferably a TDAG timestamp, and which is automatically generated in the recording period of the digital media file, and is preferably added to the metadata of the recorded digital media file. This in particular enables further improved creator identification. Advantageously, it possible to further increase forgery safety, in particular using the blockchain technology or the DLT technology, in particular with the DAG architecture, preferably with the TDAG architecture. In particular, the blockchain timestamp or the DLT timestamp is automatically generated by the app or by the recording apparatus at the time of the recording of the digital media file and is preferably added to the metadata of the digital media file. In particular, the blockchain timestamp or the DLT timestamp is based on an internal time of the recording apparatus or on a synchronized time obtained from the internet at the time of the recording of the media file. In particular, the internal time of the recording apparatus is synchronized regularly and/or with an existing internet connectivity of the recording apparatus.

Beyond this it is proposed that the metadata comprises at least one further creator information, which is implemented as an application software identifier, which is automatically generated in the recording period of the digital media file, and which is preferably added to the metadata of the recorded digital media file. This in particular enables further improved creator identification. It is advantageously possible to further augment forgery safety. In particular, it is conceivable that the application software is provided with the, preferably certificate-based, application software identifier, for example an IOTA™ ID, which is preferably added to the metadata of each digital media file, in particular during its recording.

In addition, it is proposed that the metadata comprises at least one further creator information, which is realized as a hardware identifier, which is automatically generated in the recording period of the digital media file, and which is preferably added to the metadata of the recorded digital media file. This in particular enables further improved creator identification. It is advantageously possible to further augment forgery safety. It is in particular conceivable that the recording apparatus is provided with the, preferably certificate-based, hardware identifier, for example an IOTA™ ID, which is preferably added to the metadata of each digital media file that is recorded using the hardware, i. e. in particular the recording apparatus, in particular during a recording of the digital media file.

It is further proposed that the metadata comprises at least one further creator identification, which is realized as a recording location identifier, which is automatically generated in the recording period of the digital media file, and which is preferably added to the metadata of the recorded digital media file. This in particular enables further improved creator identification. It is advantageously possible to further augment forgery safety. In particular, the recording location identifier comprises geographic coordinates of the recording location, for example GPS coordinates. In particular, the geographic coordinates are determined in the recording period by the recording apparatus, in particular by a navigation device of the recording apparatus, and are transmitted to the app and/or added to the recording location identifier. In particular, the recording location identifier may alternatively or additionally comprise sensor data of an environmental-condition sensor, for example a temperature sensor, a humidity sensor, an air pressure sensor, a brightness sensor, or the like.

If moreover the creator information, in particular the blockchain timestamp, the DLT timestamp, the pseudonymized or de-identified user identifier, the true user identity, the application software identifier, the hardware identifier and/or the recording location identifier, preferably the metadata, is/are registered, encoded and/or secured via blockchain technology or via DLT technology (for example by means of a TDAG architecture like IOTA™), a particularly high degree of forgery safety is attainable. In particular, the metadata and/or the creator information are/is advantageously inseparably connected with the digital media file. In particular, the creator information is encoded and/or secured by the app and/or by the recording apparatus via blockchain technology or via DLT technology (e. g. IOTA™). By a "DLT technology" is in particular a DLT technology to be understood which has a directed acyclic graphs (DAG) architecture, preferably a transaction-based directed acyclic graphs (TDAG) architecture.

If furthermore the digital media file, in particular together with the metadata, is registered, encoded and/or secured via blockchain technology or via DLT technology, in particular via a DLT technology having a DAG architecture, preferably via a DLT technology having a TDAG architecture, a particularly high level of forgery safety is attainable. Advantageously it can be ensured that unauthorized use of the digital media file is not possible. It is advantageously possible to make sure that the digital media file cannot be opened or distributed independently from the metadata. Advantageously unauthorized separation of the digital media file and the creator information can be prevented. Advantageously an assignment of the digital media file to a user is obtainable that is traceable without alteration.

Beyond this it is proposed that the safety device, in particular additionally, comprises a fingerprint scanner, by which in the recording period of the digital media file additionally a fingerprint of the user is captured and/or analyzed for the purpose of a determination and/or verification of the user identifier, in particular the user identity, of the user making the recording. This advantageously allows further augmenting safety, in particular forgery safety. It is advantageously possible to ensure that the user initiating the recording of the digital media file is also defined as the creator of the digital media file. Advantageously, a multi-step safety procedure is facilitated, in particular in a combination with further methods for a user identification of the safety device (e. g. a user identification via the aforementioned Face-ID® technology of the Apple company). In particular, the fingerprint scanner is integrated in the recording apparatus. It is for example conceivable that the fingerprint is captured when a trigger of the recording apparatus that starts the recording of the digital media file is triggered. In particular, it is conceivable that the fingerprint is directly stored in the metafile as a creator information, or that the fingerprint is merely used for an additional local verification of the user identifier and only the determined user identifier is stored in the metafile.

It is further proposed that the safety device, in particular additionally, comprises an iris scanner by which in the recording period of the digital media file additionally a characteristic iris pattern of the user is captured and/or analyzed for a determination and/or verification of the user identifier, in particular the user identity, of the user making the recording. This advantageously allows further augmenting safety, in particular forgery safety. It is advantageously possible to make sure that the user initiating the recording of the digital media file is also defined as the creator of the digital media file. Advantageously, a multi-step safety procedure is facilitated, in particular in a combination with the further methods for a user identification of the safety device. In particular, the iris scanner is integrated in the recording apparatus. It is for example conceivable that the iris pattern is captured when looking through a viewfinder of the recording apparatus, in particular during a recording of the digital media file. In particular, it is conceivable that the iris pattern is stored directly in the metafile as a creator information, or that the iris pattern is merely used for an additional local verification of the user identifier and only the determined user identifier is stored in the metafile.

If the iris scanner is integrated in the viewfinder of the recording apparatus, especially simple and/or intuitive iris recognition is advantageously enabled. Advantageously, a high level of user-friendliness is achievable in this way.

It is furthermore proposed that the safety device comprises a microphone, via which in the recording period of the digital media file additionally a voice characteristic of the user is captured and/or analyzed for the purpose of a determination and/or verification of the user identifier, in particular the user identity, of the user making the recording. This advantageously allows further augmenting safety, in particular forgery safety. It is advantageously possible to make sure that the user initiating the recording of the digital media file is also defined as the creator of the digital media file. Advantageously, a multi-step safety procedure is facilitated, in particular in a combination with the further methods for a user identification of the safety device. In particular, the microphone is integrated in the recording apparatus. It is for example conceivable that if a user is recognized by his/her voice characteristic in pre-definable time intervals, in particular short repeated time intervals (seconds or minutes), an unlocking of the recording apparatus is maintained for a certain user identifier, and in particular the same user identifier is automatically assigned to all digital media files recorded during the unlocking, preferably without requiring renewed user identification for each of successively created digital media files. This advantageously allows further increasing user-friendliness.

Moreover, it is proposed that in the method step a digital media file comprising a pictorial representation of a person, in particular permitting identification of the person, is recorded, wherein in at least one authorization step, which in particular temporally follows the method step, preferably by the recording apparatus, a right-of-use request is sent to the person depicted in the pictorial representation. This advantageously allows concluding a user agreement between the user making the recording and the depicted person in a particularly simple and/or direct manner (on the spot). It is thus advantageously possible to dispense with a laborious exploitation of rights, in particular via an intermediary distribution platform. Advantageously an especially simple management of rights is enabled, saving time, costs and/or work input. In particular, the authorization step comprises electronic transmission of the right-of-use request, preferably as an electronic notification, from an apparatus, in particular from the recording apparatus of the user making the recording and/or from a further apparatus (e. g. a smartphone or a tablet connected to a recording apparatus that is embodied as an external camera) which is connected to the recording apparatus of the user making the recording via an interface, like for example BLE, USB, etc., to an apparatus, in particular a display device of the depicted person, like a smartphone. In particular, the right-of-use request comprises a Yes/No query regarding a grant of the right of use of the digital media file. Alternatively or additionally, the right-of-use request may comprise a monetary offer for a grant of the right of use. Alternatively or additionally, the right-of-use request may comprise a proposal for a restriction of the right of use (e. g. grant of a right of use that is temporally limited or is restricted to a specific use like a special advertising campaign, or something like that). Alternatively or additionally, the right-of-use request comprises an input option for the receiver of the right-of-use request for inputting a suggestion of a price for granting the right of use or for inputting a temporal limit of the grant of the right of use. Advantageously, the user identifier, in particular the user identity, of the user making the recording is already determined in the method step, such that the person requesting the right of use and/or the person who is granted the right of use when the right-of-use request has been accepted, are/is already identified beyond doubt and/or can be incorporated in the right-of-use agreement.

If in at least one analysis step, which is in particular located between the method step and the authorization step, the digital media file recorded in the method step is checked for images of persons, advantageously a high level of user comfort is achievable. Advantageously, a generation and/or transmission of the right-of-use request can be simplified and/or at least partially automated. In particular, the recording apparatus executes a computer-based image recognition routine, which is configured to recognize at least images of persons, preferably identities of persons.

If furthermore, upon recognition of an image of a person in the analysis step, an order to carry out the authorization step is outputted, advantageously an especially high level of user-friendliness is brought on. Advantageously, for example, in particular on the basis of the result of the analysis step, an automated query may be made whether a right-of-use request should be generated and/or sent out. For example, a query by the recording apparatus is conceivable in which the recording apparatus inquires whether a person in a digital media file who was recognized in the analysis step is a publicly known person (meaning persons of contemporary history or public persons, for example politicians, actors, etc.) or a person who is not known to the public.

It is further proposed that in the authorization step the digital media file is transmitted to a display device of the depicted person. In this way an especially high level of operating comfort is advantageously achievable. Moreover, it is advantageously possible to unambiguously define the digital media file concerned by the right-of-use. It is also advantageously possible to facilitate and/or accelerate a decision of the depicted person regarding grant or refusal of the right of use. In particular, the respective digital media file is transmitted together with the right-of-use request. In particular, transmission of the digital media file and/or the right-of-use request between the user who makes the recording and the depicted person is effected wirelessly and/or by radio transfer. However, alternatively cable-bound transmission is of course also conceivable.

If advantageously a right of use regarding the digital media file which contains the pictorial representation of the person can be temporally limited by the depicted person within the authorization step, increased control of the person of his/her right to his/her own image is advantageously enabled. It is in particular conceivable that the right-of-use request contains a reply option allowing the person to adjust the temporal limitation.

In addition, it is proposed that a right of use regarding the digital media file which contains the pictorial representation of the person, which was granted by the depicted person, is registered and secured via blockchain technology or via DLT technology. This advantageously enables a manipulation-proof documentation of a granted right of use, which was preferably granted irrevocably or in a temporally limited manner, in a tangle of the DLT technology and/or in a blockchain of the blockchain technology. This advantageously allows preventing misuse and/or fraud as well as increasing legal security. In particular, moreover a time of grant of the right of use, a time interval of the right of use, an amount of a usage fee paid, an unambiguous identifier of the digital media file, the user identifier of the user making the recording and/or of an owner of the right of use, an identifier of the depicted person and/or of the person granting the right of use, and/or the digital media file concerned by the right of use are/is registered and/or secured by means of blockchain technology or DLT technology.

Furthermore, a method is proposed for an, in particular at least substantially forgery-safe and decentralized, distribution of digital media files which metadata are assigned to by the method described above, wherein the digital media files and/or at least the metadata of the digital media files are registered and/or encoded by the blockchain technology and/or by the DLT technology, preferably by the DLT technology having the DAG or TDAG architecture, wherein when the digital media file is used, for example when the digital media file is accessed or when the digital media file is transmitted, the user identity or the user identifier of the creator of the digital media file is read out from the metadata of the digital media file, and thus usage conditions defined by the identified creator are ascertained, wherein the usage, in particular access and/or transmission, of the digital media file is permitted or prevented depending on the defined usage conditions. In this way it is possible to obtain advantageous control of transmission, sharing and/or usage of digital media files protected by copyright laws. Advantageously, unauthorized transmission, sharing and/or usage of digital media files protected by copyright laws can be prevented. Advantageously, legal distribution and/or licensing and/or legal sale of rights to digital media files may be rendered possible without an intermediary instance, like for example an image agency, preferably directly from a creator to an end user. This advantageously allows dispensing with computing capacities, costs and/or time delays caused by the intermediary instance.

By "decentralized distribution" is in particular a distribution to be understood which is free of the intermediary instance, like for example the image agency, and which is preferably effected directly from a creator and/or owner to a user. It is for example conceivable that the distribution is effected directly from the creator's recording apparatus. For this, the user is in particular, via an internet connection, given access to the recording apparatus, preferably to previews of digital media files stored on the recording apparatus. Preferably the user may then request one or several digital media file/s located on the recording apparatus and, after fulfilling the usage conditions, for example after approval of a currency transaction, in particular a cryptocurrency transaction and/or a micropayment, for example a bitcoin transaction, Ethereum transaction or an IOTA™ transaction, the user is allowed to download the digital media file from the recording apparatus. In particular, the user is permitted to filter the digital media files on the recording apparatus and/or to search the digital media files on the recording apparatus by means of a search function.

If the usage conditions comprise at least a defined usage fee, in particular a usage fee defined by the creator of the digital media file, by an owner of the digital media file and/or by a central or decentral distribution platform, advantageously an especially simple remuneration system for creators of digital media files can be created saving time, costs and/or work input. In particular, the usage fee is a payable amount in a Fiat currency, in a cryptocurrency, like for example bitcoin, Ethereum coin, IOTA, preferably with a micropayment function. A decentral distribution platform may for example be a platform, operated by a single creator or by a group of creators, on which the digital media files are offered, for example a website or just a recording apparatus released for public access or for public search.

Beyond this it is proposed that when the digital media file is used, a user identity or a user identifier of a user is ascertained and the defined usage fee is automatically requested and/or collected from the user and/or transferred to the creator, the owner or the distribution platform. In this way it is advantageously possible to create a remuneration system for creators of digital media files which saves computing resources, time and/or energy input. Advantageously a high level of user-friendliness is achievable. Alternatively, it is conceivable that the usage condition, for example the usage fee, is defined in advance, which means that it is not requested separately or does not have to be requested separately with each usage and/or each transmission.

It is further proposed that a transmission of the digital media file via a social media platform, like for example Facebook™, or via a chat platform, like for example WhatsApp™, constitutes a usage of the digital media file. This advantageously allows legal sharing of digital media files which are protected by copyright laws. In particular, with each transmission or sharing of digital media files, the metafile of the digital media file is read out by the social media platform or by the chat platform, and it is thus determined whether the usage conditions permit sharing or transmission, wherein in particular—if applicable—a usage fee is transferred to the creator and/or owner for a release of transmission and/or sharing. It would also be conceivable that the social media platform or the chat platform applies a restriction of allowed digital media files only for those which are digital media files identifiable under copyright laws. As a result, advantageously a distribution of digital media files with illegal contents can be prevented and/or can be investigated more easily by the police (for example by a court order to disclose the true user identity). Furthermore, in particular a licensing or sale of rights to a digital media file also constitutes usage. It is further conceivable that a transfer of rights to a digital media file is registered in the blockchain or in the Distributed Ledger in the context of the digital media file.

Furthermore, a recording apparatus having a computer functionality is proposed, with the application software that is at least configured for executing the method for assigning a creator to a digital media file. In particular, the recording apparatus having the computer functionality is realized as a digital camera, as a smartphone with a digital camera or as a personal computer with a digital camera, for example a tablet. This in particular enables advantageous creator identification.

In addition, a display device having a computer functionality is proposed, with an application software that is at least configured for executing the method for a distribution of digital media files. In particular, the display device having the computer functionality is realized as a smartphone with a screen or as a personal computer with a screen. It is conceivable that in the decentral distribution a direct connection is established between the display device and the recording apparatus. Advantageously, legal distribution and/or licensing of digital media files and/or legal sale of rights to digital media files is enabled without an intermediary instance, like for example an image agency, preferably directly from a creator to an end user. This advantageously allows dispensing with computing capacities, costs and/or time delays caused by the intermediary instance.

The method according to the invention, the recording apparatus according to the invention and the display device according to the invention shall herein not be limited to the application and implementation described above. In particular, in order to fulfill a functionality described here, the method according to the invention, the recording apparatus according to the invention and the display device according to the invention may comprise a number of individual elements, components and units that differs from a number given here.

DRAWINGS

Further advantages will become apparent from the following description of the drawings. In the drawings exemplary embodiments of the invention are illustrated. The drawings, the description and the claims contain a plurality of features in combination. Someone skilled in the art will purposefully also consider the features separately and will find further convenient combinations.

It is shown in.

DESCRIPTION OF THE EXEMPLARY EMBODIMENTS

Figure 1A:
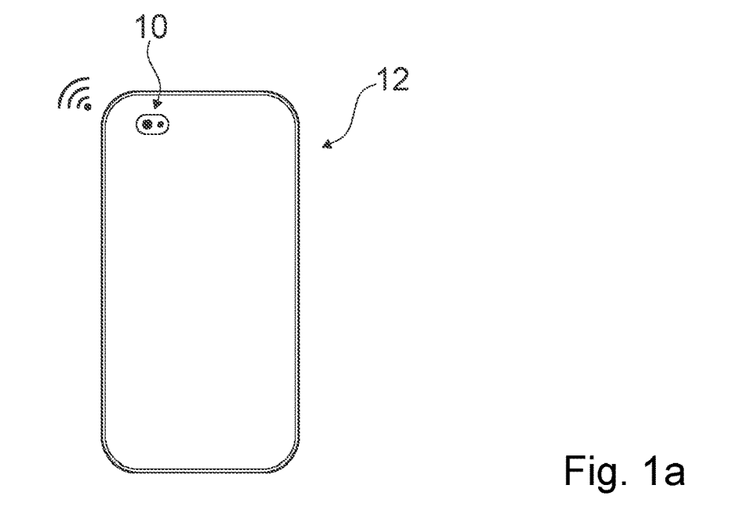
FIG. 1a a schematic illustration of a first recording apparatus for recording a digital media file, in a front view, FIG. 1b a schematic illustration of the first recording apparatus in a side view, FIG. 1c a schematic illustration of the first recording apparatus in a rear view, FIG. 2a a schematic illustration of a second recording apparatus for recording a digital media file, in a front view, FIG. 2b a schematic illustration of the second recording apparatus in a side view, FIG. 2c a schematic illustration of the second recording apparatus in a rear view, FIG. 3 a schematic illustration of a digital media file recorded by the recording apparatus, FIG. 4 a schematic flow chart of a method for assigning at least one creator to the digital media file, FIG. 5 a schematic flow chart of a method for a distribution of digital media files which a creator has been assigned to by the method shown in FIG. 4, FIG. 6 a schematic illustration of a display device for a usage of a digital media file acquired via the method shown in FIG. 5, in a front view, and FIG. 7 a schematic illustration of a further display device with an exemplary right-of-use request.
Figure 1B:
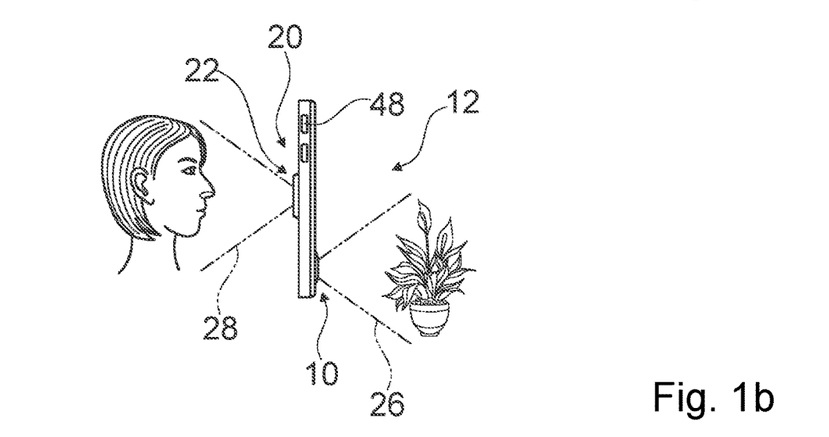
Figure 1C:
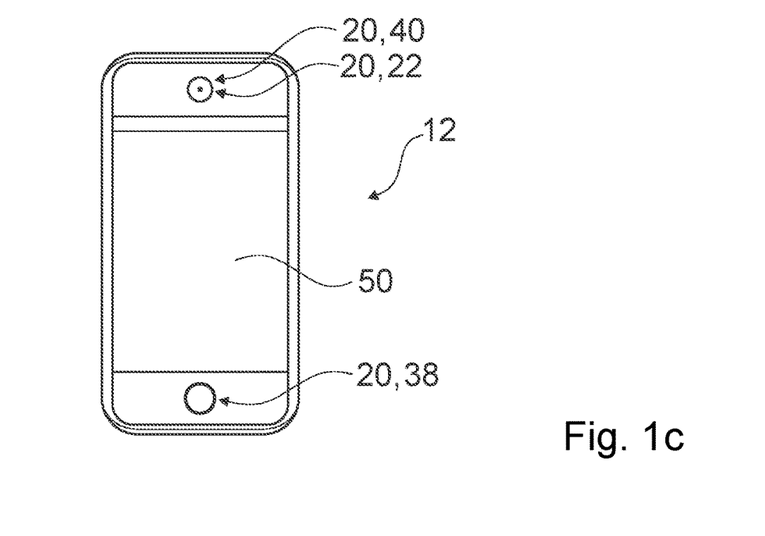

FIGS. 1a to 1c show a first exemplary recording apparatus 12. The recording apparatus 12 is embodied as a smartphone. The recording apparatus 12 has a computer functionality. The recording apparatus 12 comprises a processor unit (not shown) and a memory unit (not shown). On the memory unit of the recording apparatus 12 there is an application software (app) stored, which is executable, among others, by the recording apparatus 12 via the processor unit and an operation system of the recording apparatus 12. The app is in particular already pre-installed on the recording apparatus 12 in the delivery status. Alternatively, the app may be installed on the recording apparatus 12 later on. The recording apparatus 12, in particular the application software, is at least configured for carrying out a method, in particular a method as described below, for assigning at least one creator to a digital media file 24.

The recording apparatus 12 comprises a recording device 10. The recording apparatus 12 and/or the recording device 10 are/is configured for a recording of a digital media file 24. In the case shown the digital media file 24 may be a video or an image. The recording device 10 is embodied as a front-facing camera of the smartphone. The recording apparatus 12 comprises a camera 22. The camera 22 is realized as a rear-facing camera. The recording apparatus 12 comprises a safety device 20. The safety device 20 is at least configured for a determination and/or for a verification of a user identifier 54, wherein the user identifier 54 may be pseudonymized or de-identified. Alternatively or additionally, the safety device 20 may be configured for a direct determination and/or verification of a user identity.

The safety device 20 comprises the camera 22. The camera 22 is configured for the determination and/or for a verification of a user identifier 54 and/or of the user identity. The safety device 20, in particular the camera 22, is configured for a face recognition and/or for a facial-feature recognition. The app is configured for processing an image of the camera 22 for the purpose of a face recognition and/or facial-feature recognition. The safety device 20, in particular the camera 22, is configured for a determination and/or verification of the user identifier 54 of a user who makes a recording of a digital media file 24. A view field 26 of the recording device 10 that is embodied as a front-facing camera and a view field 28 of the camera 22 are oriented in at least substantially opposed directions (see FIG. 1b). The face recognition implements a first stage of a user recognition.

The safety device 20 comprises a fingerprint scanner 38 (see FIG. 1c). The fingerprint scanner 38 is integrated in the recording apparatus 12. The fingerprint scanner 38 may be integrated in a screen 50 of the recording apparatus 12, in particular of the smartphone. The fingerprint scanner 38 is configured to capture a characteristic fingerprint of the user for the determination and/or verification of the user identifier 54. The app is configured for a processing of a fingerprint captured by the fingerprint scanner 38 for the purpose of a determination and/or verification of the user identifier 54 of the user making a recording of a digital media file 24. The fingerprint recognition implements a further (second) stage of the user recognition.

The safety device 20 comprises a microphone 48 (see FIG. 1b). The microphone 48 is integrated in the recording apparatus 12. The microphone 48 is configured to capture a voice characteristic of the user for the determination and/or verification of the user identifier 54. The app is configured for a processing of a voice captured by the microphone 48 for the purpose of a determination and/or verification of the user identifier 54 of the user making a recording of a digital media file 24. The voice recognition implements a further (third) stage of the user recognition.

Figure 2A:
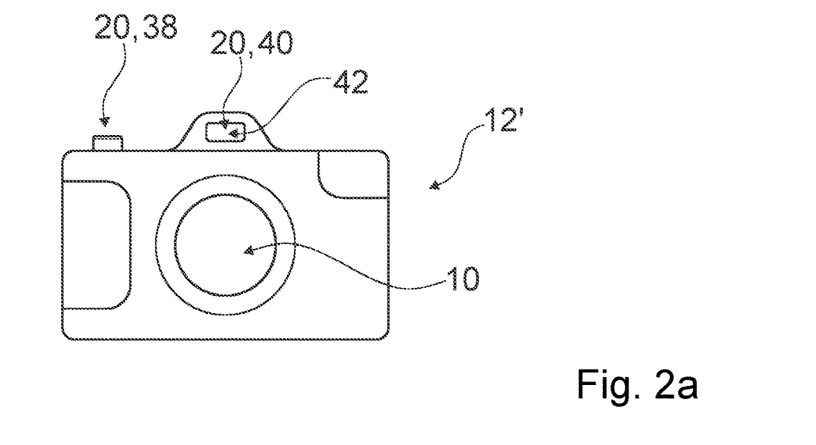
Figure 2B:
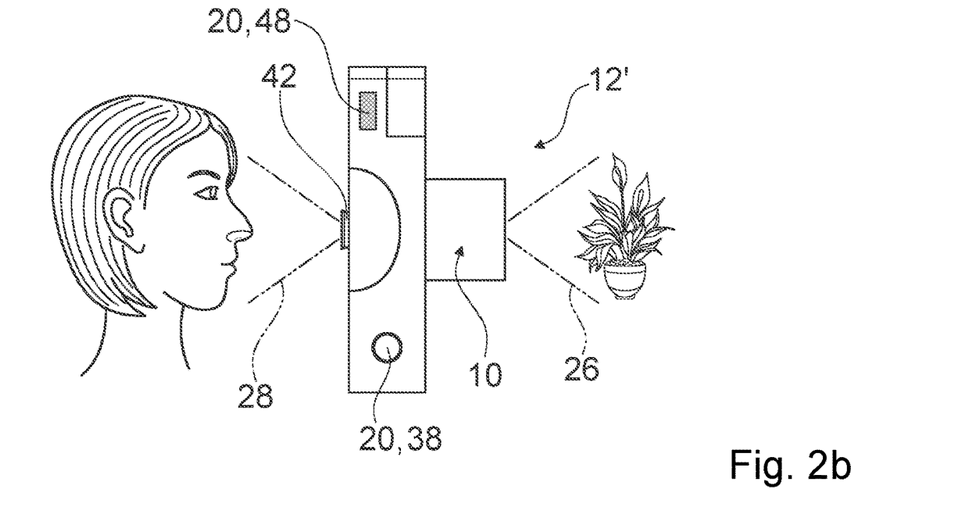
Figure 2C:
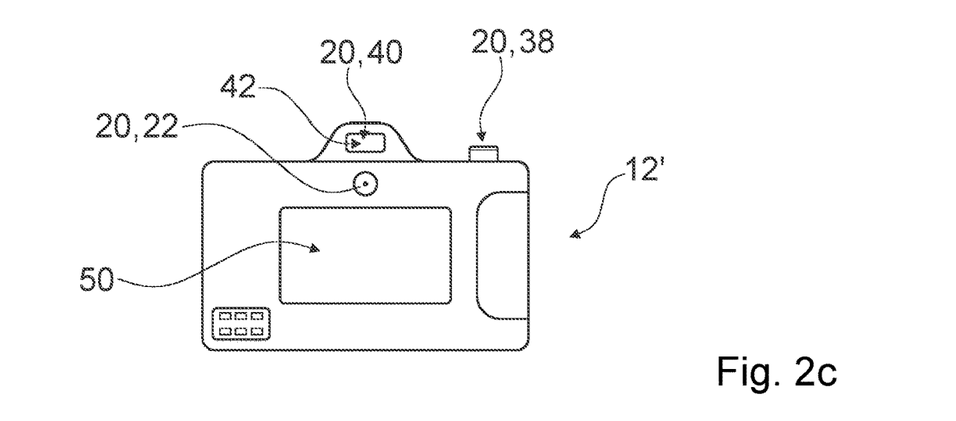

FIGS. 2a to 2c show a second exemplary recording apparatus 12'. The recording apparatus 12' is embodied as a digital camera. The recording apparatus 12' has a computer functionality. The recording apparatus 12' comprises a processor unit (not shown) and a memory unit (not shown). On the memory unit of the recording apparatus 12' there is the app stored which is executable, among others, by the recording apparatus 12' via the processor unit and an operation system of the recording apparatus 12'. The second exemplary recording apparatus 12' and the first exemplary recording apparatus 12 have essentially identical functionalities (see FIGS. 2a and 2b). The safety device 20 comprises an iris scanner 40. The iris scanner 40 is integrated in the recording apparatus 12'. The iris scanner 40 is configured to capture a characteristic iris pattern of the user for the determination and/or verification of the user identifier 54. The app is configured for a processing of an iris pattern captured by the iris scanner 40 for the purpose of a determination and/or verification of the user identifier 54 of the user making a recording of a digital media file 24. The iris recognition implements a further (fourth) step of the user recognition. The recording apparatus 12' that is embodied as a digital camera comprises a viewfinder 42. The iris scanner 40 is integrated in the viewfinder 42. It is conceivable that the recording apparatus 12 that is embodied as a smartphone also comprises a viewfinder 42 which an iris scanner 40 is integrated in.

Figure 3:
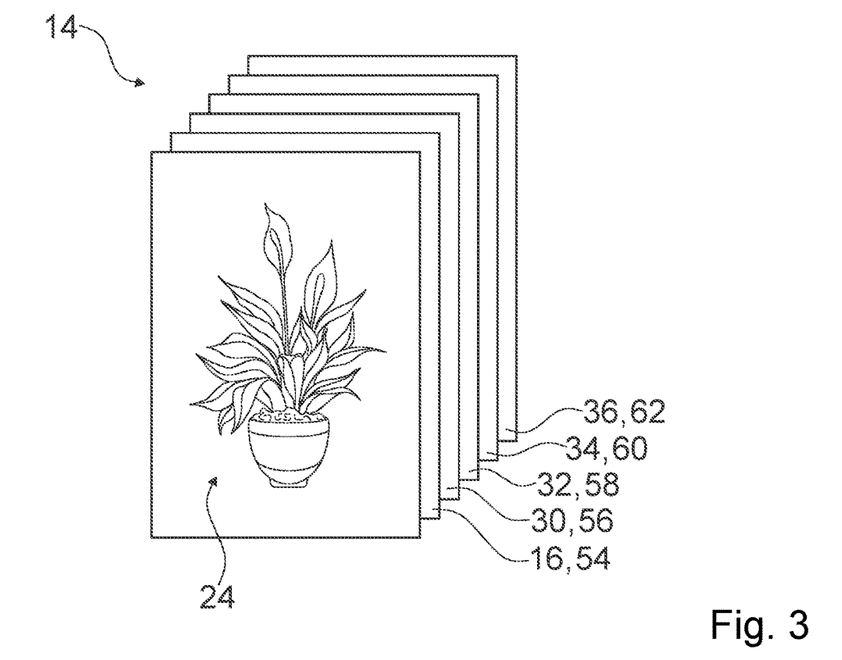

FIG. 3 shows a schematic illustration of the digital media file 24. The digital media file 24 is embodied as a digital photograph. The digital media file 24 comprises schematically depicted metadata 14. The metadata 14 comprises creator information 16, 30, 32, 34, 36. At least one creator information 16 is the user identifier 54 of the user who makes the recording, i. e. of the creator of the digital media file 24. At least one further creator information 30 is a timestamp 56, for example a blockchain timestamp or a Digital Ledger Technology (DLT) timestamp, of the time of the recording of the digital media file 24. At least one creator information 32 is an application software identifier 58 of the application software which enables the recording and/or which implements the assignment of the metadata 14 to the digital media file 24. At least one creator information 34 is a hardware identifier 60 of the recording apparatus 12. At least one creator information 36 is a recording location identifier 62 of a location of the recording of the digital media file 24.

Figure 4:
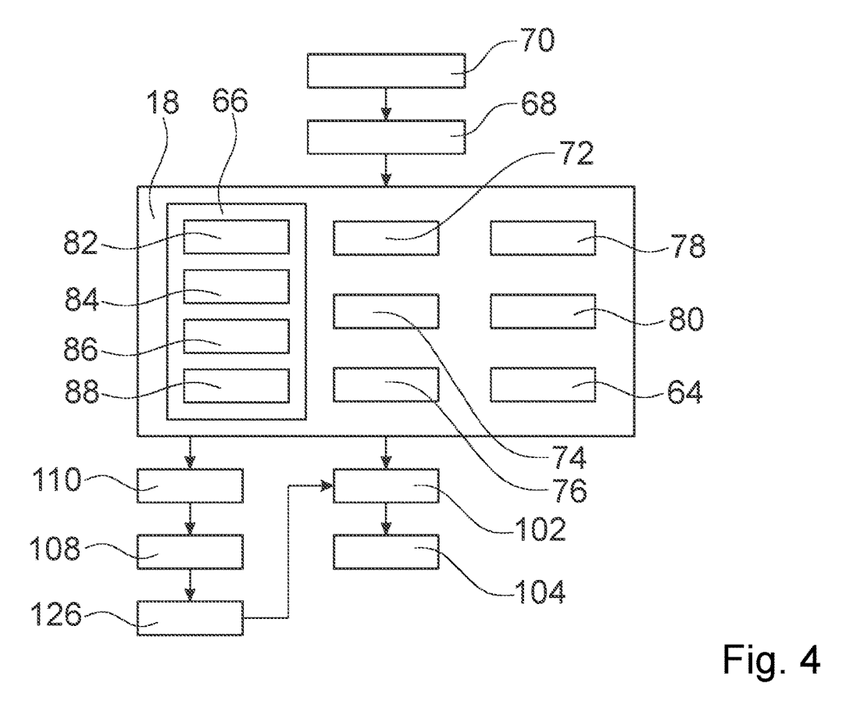

FIG. 4 shows a schematic flow chart of a method for an, in particular at least substantially forgery-safe, assignment of at least one creator to the digital media file 24. In at least one method step 70 an unambiguous identification of a user of the recording apparatus 12, which has the application software for carrying out the method described here, is executed by means of a know-your-customer method, in particular a legitimation check. The legitimized user identity is then stored in the application software as a user identity or as a user identifier 54. In at least one further method step 68 the user identity or the user identifier 54 is pseudonymized or de-identified. For example, an IOTA™-ID may be used for this purpose. This advantageously allows ensuring that the user identifier 54 is unchangeable and/or that the true (legitimized) user identity of the user is not disclosed to the public. In order to enhance data protection, the true (legitimized) user identity may advantageously be kept safe, centrally or decentrally and encoded, by a provider of the application software or by an external institution, like for example the IOTA™ foundation. As a result, it is advantageously ensured that access to the true (legitimized) user identity of the user is only possible with the user's consent.

In at least one further method step 18 the digital media file 24 is recorded. The digital media file 24 is recorded by the recording apparatus 12. The digital media file 24 is recorded by the recording device 10 of the recording apparatus 12. The digital media file 24 is recorded by the front-facing camera of the recording apparatus 12. The recording of the digital media file 24 is started and/or initiated by the user, for example by pressing on a touchscreen of a smartphone or on a trigger of a digital camera. In at least one partial method step 66 of the method step 18, the user identifier 54 is determined and/or verified. In a sub method step 82 of the partial method step 66, the user identifier 54 is determined and/or verified by the safety device 20. In the partial method step 66, the determination and/or verification of the user identifier 54 of the user making the recording is carried out, in particular in a fully automated manner, by the camera 22 of the recording apparatus 12 in the recording period of the digital media file 24. For a determination and/or verification of the user identifier 54 of the user making the recording, a face recognition and/or a facial-feature recognition are/is carried out on the basis of images recorded by the camera 22. In a further, in particular optional, method substep 84 of the partial method step 66, a fingerprint of the user is captured by the fingerprint scanner 38. For the determination and/or verification of the user identifier 54 of the user making the recording, additionally the fingerprint of the user is captured and/or analyzed in the method substep 84. The capturing and/or analysis of the fingerprint is carried out within the recording period of the digital media file 24. The method substep 84 constitutes a second, in particular optional, safety stage of the safety device 20. In a further, in particular optional, method substep 86 of the partial method step 66, a characteristic iris pattern of the user is captured by the iris scanner 40. For the determination and/or verification of the user identifier 54 of the user making the recording, additionally the user's characteristic iris pattern is captured and/or analyzed in the method substep 86. The capturing and/or analysis of the characteristic iris pattern is realized in the recording period of the digital media file 24. The method substep 86 constitutes a third, in particular optional, safety stage of the safety device 20. In a further, in particular optional, method substep 88 of the partial method step 66, a voice characteristic of the user is captured by the microphone 48. For the determination and/or verification of the user identifier 54 of the user who makes the recording, additionally the voice characteristic of the user is captured and/or analyzed in the method substep 88. The capturing and/or analysis of the voice characteristic is carried out within the recording period of the digital media file 24. The method substep 88 constitutes a fourth, in particular optional, safety stage of the safety device 20.

In at least one further partial method step 72 of the method step 18, the timestamp 56, in particular the blockchain timestamp or the Digital Ledger Technology (DLT) timestamp, is generated. In the partial method step 72 the timestamp 56, in particular the blockchain timestamp or the Digital Ledger Technology (DLT) timestamp, is generated by the application software on the basis of an internet time or of a system time of the recording apparatus 12. In the partial method step 72 the generation of the timestamp 56, in particular the blockchain timestamp or the Digital Ledger Technology (DLT) timestamp, is implemented, in particular in a fully automated manner, in the recording period of the digital media file 24. In at least one further partial method step 74 of the method step 18, the application software identifier 58 is generated. In the partial method step 74 the application software identifier 58 is read out from the application software. In the partial method step 74 the generation of the application software identifier 58 is implemented, in particular in a fully automated manner, in the recording period of the digital media file 24. In at least one further partial method step 76 of the method step 18, the hardware identifier 60 is generated. In the partial method step 76 the hardware identifier 60 is read out from the recording apparatus 12. In the partial method step 76 the generation of the hardware identifier 60 is implemented, in particular in a fully automated manner, in the recording period of the digital media file 24. If the application software identifier 58 and/or the hardware identifier 60 are/is embodied as a certificate-based IOTA™ ID, this advantageously enables a forgery-safe and in particular non-hackable identification of the application software used and/or of the recording apparatus 12 used. In at least one further partial method step 78 of the method step 18, the recording location identifier 62 is generated. In the partial method step 78 the recording location identifier 62 is read out from a navigation device (not shown) of the recording apparatus 12. In the partial method step 78 the generation of the recording location identifier 62 is implemented, in particular in a fully automated manner, in the recording period of the digital media file 24.

In at least one further partial method step 80 of the method step 18, the creator information 16, 30, 32, 34, 36, in particular the timestamp 56, the pseudonymized or de-identified user identifier 54, the application software identifier 58, the hardware identifier 60 and/or the recording location identifier 62 are encoded and/or secured via blockchain technology or via DLT technology.

In the partial method steps 66, 72, 74, 76, 78 of the method step 18, the creator information 16, 30, 32, 34, 36 are automatically generated in the recording period of the digital media file 24. The creator information 16, 30, 32, 34, 36 is herein generated by the recording apparatus 12, preferably by an application software of the recording apparatus 12. In at least one further partial method step 64 of the method step 18, the digital media file 24 is provided with the metadata 14. In the partial method step 64 the metadata 14 is stored, in particular in the memory unit of the recording apparatus 12, together with the digital media file 24 and/or as an integral part of the digital media file 24.

In at least one further method step 102 the digital media file 24 together with the metadata 14, or only the metadata 14 of the digital media file 24, is registered, encoded and/or secured via blockchain technology or via DLT technology. In at least one further method step 104, the digital media file 24, secured via blockchain technology or via DLT technology, is made available to the public via a distribution platform.

Figure 7:
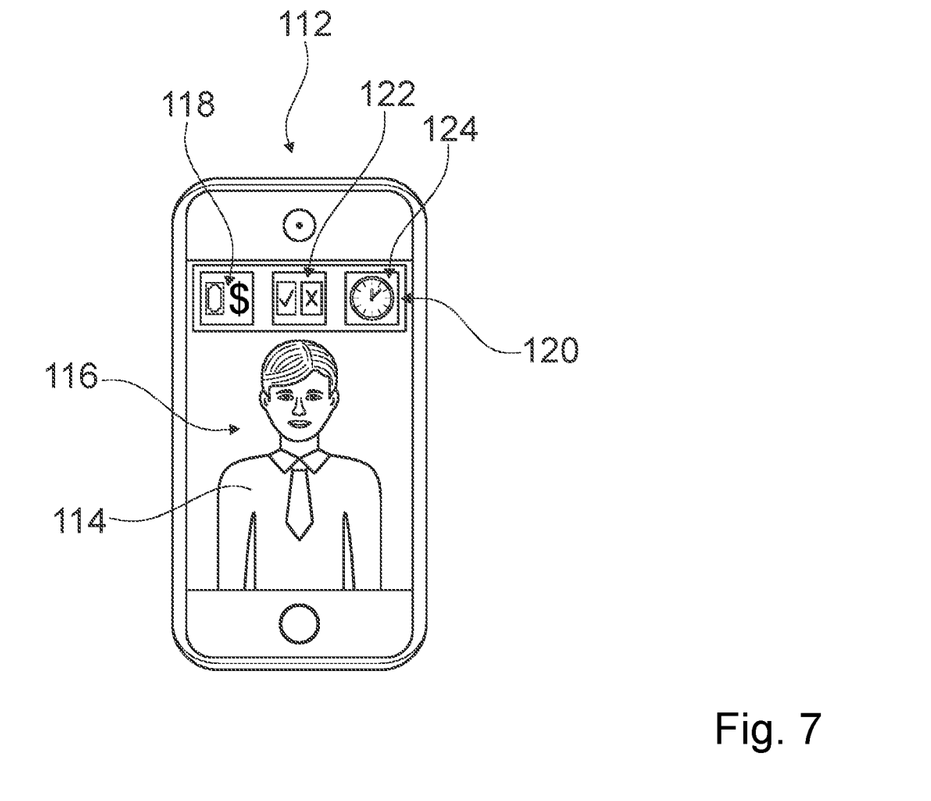

In the method step 18 a digital media file 24 can be recorded which comprises a pictorial representation 116 of a person 114 (see also FIG. 7). In an analysis step 110 the digital media file 24 recorded in the method step 18 is checked for images of persons 114. In the analysis step 110 an image recognition of the image contained in the digital media file 24 is carried out, which is configured to recognize a presence of images of persons 114. Upon recognition of an image of a person 114, in the analysis step 110 a request to execute an authorization step 108 is outputted. The authorization step 108 follows the method step 18 in temporal sequence.

In the authorization step 108, in particular if the digital media file 24 comprises the pictorial representation 116 of the person 114, a right-of-use request 124 (see also FIG. 7) is sent to the person 114 who is depicted in the pictorial representation 116. The right-of-use request 124 comprises a request of the user to the person 114 for a transfer (against payment or free of charge) of a right of use to the pictorial representation 116 of the person 114 (see also FIG. 7). The right-of-use request 124 comprises an input field 118 for a monetary request for grant of the right of use, which is returned to the requesting user by the person 114. The right of use concerning the digital media file 24 containing the pictorial representation 116 of the person 114 can be temporally limited by the depicted person 114 within the authorization step 108. The right-of-use request 124 comprises an input field 120 for a temporal limitation of the grant of the right of use, which is returned to the requesting user by the person 114. The right-of-use request 124 comprises an input field 122 for consenting to grant the right of use and/or for refusing to grant the right of use, which is returned to the requesting user by the person 114. Moreover, in the authorization step 108 the digital media file 24 is transmitted to a display device 112 of the depicted person 114. In at least one further method step 126 the right of use of the digital media file 24 containing the pictorial representation 116 of the person 114, which was granted by the depicted person 114, is registered and/or secured via blockchain technology or via DLT technology. In the method step 126 the right of use and/or the transaction concerning the right of use are/is entered into a blockchain or into a Digital Ledger.

Figure 5:
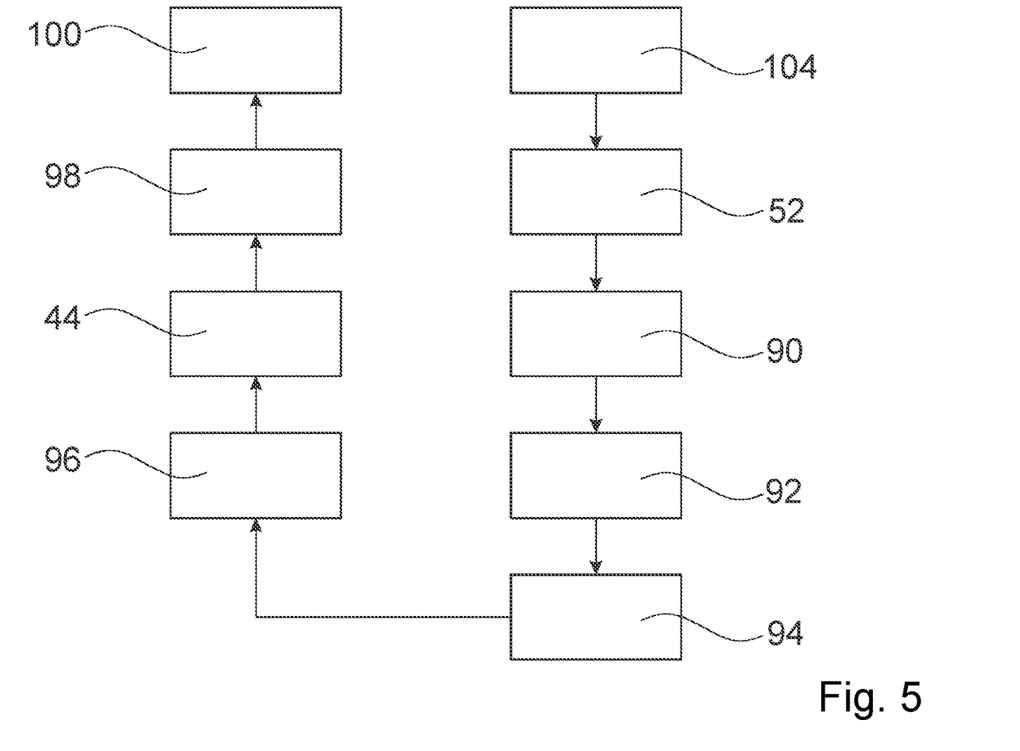

FIG. 5 shows a schematic flow chart of a method for an, in particular forgery-safe and preferably decentralized, distribution of digital media files 24, which metadata 14 is assigned to by means of the method illustrated in FIG. 4, the digital media files 24 and/or at least the metadata 14 of the digital media files 24 being registered and/or encoded via blockchain technology or via Digital Ledger (DLT) Technology. In at least one method step 52 the digital media file 24 is released for distribution. For this purpose, for example the digital media file 24 or a preview of the digital media file 24 may be offered on a media file marketplace (e. g. an IOTA™ media data marketplace), on a private website or on a further publicly accessible platform. Alternatively or additionally, it is conceivable that the digital media file 24 is made findable for a specialized search engine (e.g. an IOTA™ media data search engine) by the release for distribution. The digital media file 24 may herein remain on the local recording apparatus 12 (from which it is directly downloadable after acquisition) or the digital media file 24 may be transferred to the public platform for a distribution that starts from there. A preview is displayed with reduced resolution or with a watermark or the like. In each transfer the metadata 14—and thus the creator information 16, 30, 32, 34, 36—remain inseparably connected with the digital media file 24.

In at least one further method step 90 the digital media file 24 is requested by a user for usage. In at least one further method step 92, if the digital media file 24 is used, for example if the digital media file 24 is accessed or if the digital media file 24 is transmitted by the user, the user identity or the user identifier 54 of the creator of the digital media file 24 is read out from the metadata 14 of the digital media file 24. In at least one further method step 94, a usage condition defined by the identified creator is ascertained on the basis of the read-out meta data 14. The usage conditions comprise at least a usage fee defined in particular by the creator of the digital media file 24, by an owner of the digital media file 24 and/or by a central or decentral distribution platform and/or by the specialized search engine. In at least one further method step 96, the usage of the digital media file 24, in particular the access and/or the transmission of the digital media file 24, is permitted or prevented depending on the defined usage conditions. It is herein conceivable that an access is limited, in particular depending on the usage conditions, e. g. temporally limited or limited regarding a number of usages or limited regarding a usage scope.

In at least one further method step 44, if the digital media file 24 is used, a user identity or a user identifier 54 of a user is ascertained and the defined usage fee is automatically requested and/or collected from the user and/or, preferably directly, transferred to the creator, the owner, the distribution platform or the specialized search engine. The usage fee is herein collected from an account which is preferably linked to the distribution platform or to the specialized search engine. The account may herein be implemented as a crypto currency account, in particular a crypto wallet. The distribution platform and/or the specialized search engine may be implemented as an application software on a smartphone. In at least one further method step 98, the digital media file 24 is transmitted via a social media platform or via a chat platform. The transmission of the digital media file 24 via the social media platform or via the chat platform constitutes a usage of the digital media file 24, which requires complying with the defined usage conditions, for example payment of the usage fee. The usage fee may prescribe a micropayment for a transmission of the digital media file 24 via the social media platform or via the chat platform, i. e. in particular a payment in a range of fractions of a eurocent. It is in particular conceivable that a usage of the digital media file 24, in particular a transmission of the digital media file 24 via the social media platform or via the chat platform, is allowed only if a permission for automatic collection of the usage fee has been given by the user. In at least one further method step 100 the social media platform or the chat platform automatically identifies a digital media file 24 that is protected by the method according to FIG. 4 and blocks sharing and/or transmission as long as payment of the usage fee has not been consented to. This advantageously allows a provider of the social media platform or of the chat platform protecting himself from copyright law infringements being committed on the social media platform or the chat platform.

Figure 6:
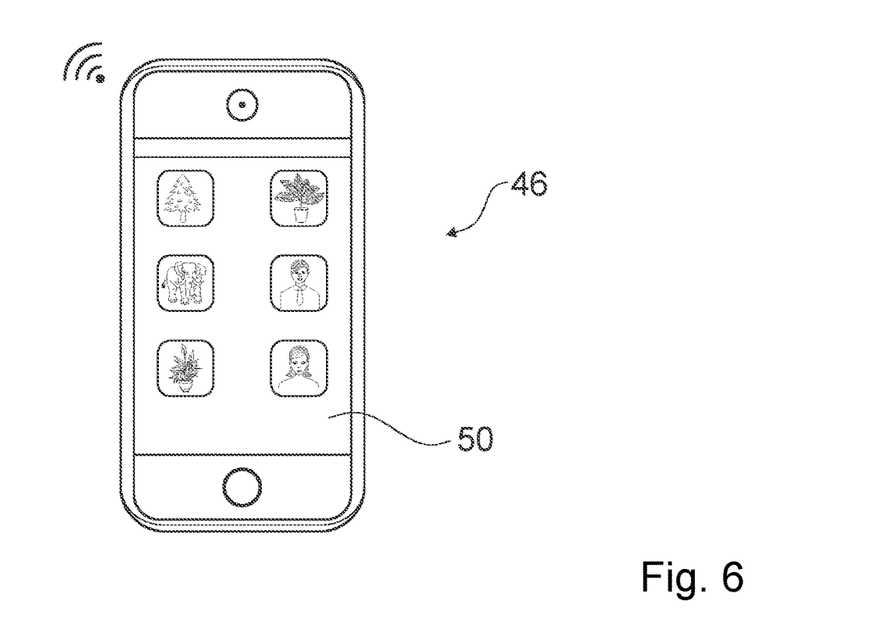

FIG. 6 shows a further exemplary display device 46 having a computer functionality. The display device 46 is embodied as a smartphone. The display device 46 has an application software, which is in particular pre-installed and which is at least configured for executing the method for a distribution of digital media files 24 which is illustrated in FIG. 5. The application software of the display device 46 may comprise the distribution platform, the specialized search engine, the social media platform and/or the chat platform.

An exemplary application could look like the following: A user, for example a newspaper, is planning a report of a certain event, for example a political demonstration or a concert. At a certain time during the event, various creators on the spot generate digital media files 24, e. g. images or videos, in particular by means of various recording apparatuses 12. The user knows time and place of the event and has at the time of the event the currently available digital media files 24 displayed to him. For this the user activates his display device 46 and opens the application software, for example the specialized search engine. The user searches the available digital media files 24 in regard to location and by temporal filter. Said digital media files 24 may even be almost real-time recordings. If the user finds something, he/she will request the desired digital media file 24. By this the usage conditions and the usage fee are determined. When payment of the usage fee has been released by the user, the digital media file 24 is transferred directly from the creator, in particular directly from the creator's recording apparatus 12, to the user, who thus advantageously receives extremely current digital media files 24 of the event. In the method for a distribution of digital media files 24, the digital media file 24 may advantageously be transferred directly from the creator, in particular from the creator's recording apparatus 12, to the user, in particular to the user's display device 46. In the method for a distribution of digital media files 24, payment of the usage fee may advantageously be made directly from the user to the creator. It is conceivable that the provider of the application software retains a percentage of the usage fee as a commission and/or as a copyright protection fee.

FIG. 7 exemplarily shows the display device 46 of the person 114 in a display state in which the right-of-use request 124 is indicated.

REFERENCE NUMERALS

10 recording device
12 recording apparatus
14 metadata
16 creator information
18 method step
20 safety device
22 camera
24 digital media file
26 view field
28 view field
30 further creator information
32 further creator information
34 further creator information
36 further creator information
38 fingerprint scanner
40 iris scanner
42 viewfinder
44 method step
46 display device
48 microphone
50 screen
52 method step
54 user identifier
56 timestamp
58 application software identifier
60 hardware identifier
62 recording location identifier
64 partial method step
66 partial method step
68 method step
70 method step
72 partial method step
74 partial method step
76 partial method step
78 partial method step
80 partial method step
82 method substep
84 method substep
86 method substep
88 method substep
90 method step
92 method step
94 method step
96 method step
98 method step
100 method step
102 method step
104 method step
108 authorization step
110 analysis step
112 display device
114 person
116 pictorial representation
118 input field
120 input field
122 input field
124 right-of-use request
126 method step

The invention claimed is:

1. A method for a distribution of digital media files which metadata, including at least one creator, are assigned to via at least the method steps of recording the digital media file by means of a recording device of a recording apparatus, determining and/or verifying a user identifier of a user of the recording apparatus making the recording by a safety device comprising a camera of the recording apparatus, providing the digital media file with metadata which is then integrated in the digital media file and/or inseparably connected with the digital media file, wherein the metadata comprises at least one creator information, that is realized as the user identifier, and that is generated automatically in the recording period of the digital media file, and wherein the metadata comprises at least one further creator information, which is realized as a blockchain timestamp or as a Distributed Ledger Technology (DLT) timestamp that is automatically generated in the recording period of the digital media file, with the distribution of digital media files comprising at least the method steps of reading out the metadata including the user identifier of the creator of the digital media file from the metadata of the digital media file when the digital media file is transmitted via a social media platform or via a chat platform, on the basis of the read-out metadata ascertaining at least one usage condition defined by the identified creator, and permitting or preventing the access to the transmitted digital media file and/or the transmission of the digital media file depending on the read-out usage conditions, wherein the usage conditions comprise at least a usage fee defined by an owner of the digital media file and/or by the creator of the digital media file, wherein when the digital media file is used, a user identity or a user identifier of the user of the digital media file is ascertained and the defined usage fee is automatically requested and/or collected from the user of the digital media file and transferred at least to the creator of the digital media file, wherein in the method step a digital media file comprising a pictorial representation of a person is recorded, wherein in at least one authorization step a right-of-use request is sent to the person depicted in the pictorial representation, and wherein the individual right-of-use request comprises an input field for the receiver of the right-of-use request for inputting a temporal limit of a grant of a right of use of the respective digital media file, such that the right of use regarding the digital media file which comprises the pictorial representation of the person can be temporally limited by the depicted person within the authorization step.

2. The method according to claim 1, wherein at least a face recognition and/or a facial-feature recognition is carried out by the safety device for a determination and/or verification of the user identifier of the user making the recording.

3. The method according to claim 1, wherein the recording device is realized as a front-facing camera of the recording apparatus, wherein a view field of the front-facing camera and a view field of the camera are oriented or can be oriented in at least substantially opposed directions.

4. The method according to claim 1, wherein the user identifier is pseudonymized or de-identified.

5. The method according to claim 1, wherein the metadata comprises at least one further creator information, which is implemented as an application software identifier and which is automatically generated in the recording period of the digital media file.

6. The method according to claim 1, wherein the metadata comprises at least one further creator information, which is realized as a hardware identifier and which is automatically generated in the recording period of the digital media file.

7. The method according to claim 1, wherein the metadata comprises at least one further creator information, which is realized as a recording location identifier and which is automatically generated in the recording period of the digital media file.

8. The method according to claim 1, wherein the creator information is encoded and/or secured via blockchain technology or via DLT technology.

9. The method according to claim 1, wherein the digital media file is registered, encoded and/or secured via blockchain technology or via DLT technology.

10. The method according to claim 1, wherein the safety device comprises a fingerprint scanner, by which in the recording period of the digital media file additionally a fingerprint of the user is captured and/or analyzed for the purpose of a determination or verification of the user identifier of the user making the recording.

11. The method according to claim 1, wherein the safety device comprises an iris scanner, by which in the recording period of the digital media file additionally a characteristic iris pattern of the user is captured and/or analyzed for the purpose of a determination and/or verification of the user identifier of the user making the recording.

12. The method according to claim 11, wherein the iris scanner is integrated in a viewfinder of the recording apparatus.

13. The method according to claim 1, wherein the safety device comprises a microphone, via which in the recording period of the digital media file additionally a voice characteristic of the user is captured and/or analyzed for the purpose of a determination and/or verification of the user identifier of the user making the recording.

14. The method according to claim 1, wherein in at least one analysis step the digital media file recorded in the method step is checked for images of persons.

15. The method according to claim 14, wherein upon recognition of an image of a person in the analysis step, an order to carry out the authorization step is outputted.

16. The method according to claim 1, wherein in the authorization step the digital media file is transmitted to a display device of the depicted person.

17. The method according to claim 1, wherein a right of use regarding the digital media file which comprises the pictorial representation of the person, which was granted by the depicted person, is registered and/or secured via blockchain technology or via DLT technology.

18. The method according to claim 1, wherein the digital media files and/or at least the metadata of the digital media files are registered and/or encoded via blockchain technology or via Distributed Ledger Technology (DLT).

19. A display device having a computer functionality with an application software that is at least configured for executing a method for a distribution of digital media files according to claim 18.

20. A recording apparatus having a computer functionality with an application software that is at least configured for executing a method for assigning a creator to a digital media file according to claim 1.

* * * * *